D. N. SMITH.
Turning Lathe.
No. 21,088. Patented Aug. 3, 1858.
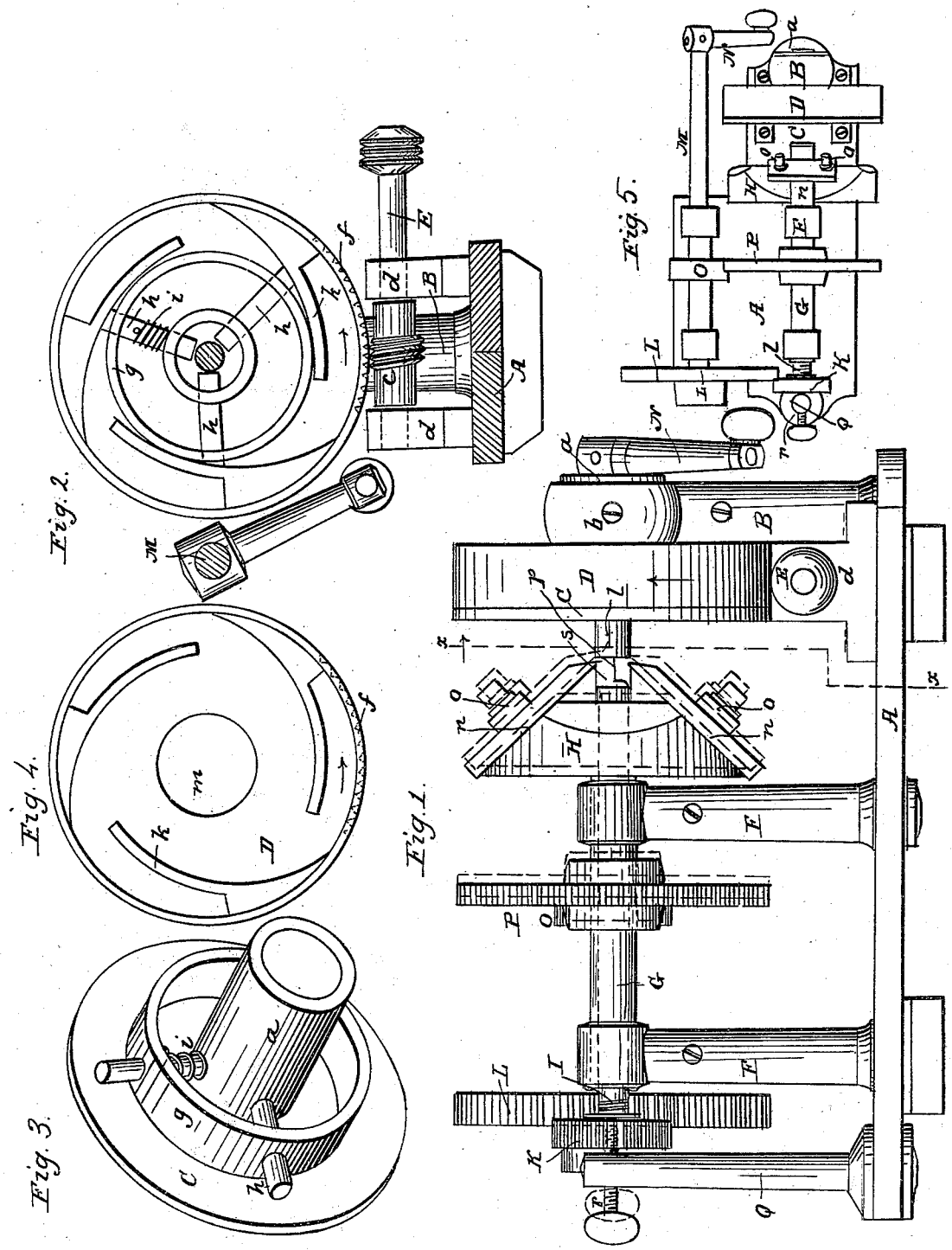

UNITED STATES PATENT OFFICE.

DANL. N. SMITH, OF BOSTON, MASSACHUSETTS.

CHUCK FOR CENTERING, &c.

Specification of Letters Patent No. 21,088, dated August 3, 1858.

*To all whom it may concern:*

Be it known that I, DANIEL N. SMITH, of Boston, in the county of Suffolk and State of Massachusetts, have invented certain new and useful Improvements in Machines for Centering Shafts and other Turned Work, of which the following is a full, clear, and exact description, reference being had to the accompanying drawings, in which—

Figure 1 is a side elevation of my machine. Fig. 2 a transverse vertical section on the line $x, x,$ of Fig. 1, with the parts behind the disk C, shown in red. Figs. 3 and 4 details to be referred to hereafter. Fig. 5 a plan reduced in size.

The object of my present invention is to produce a machine, or an arrangement of machinery by which a shaft or other similar article may be centered, or have a hole drilled in its end, in the axis of the shaft, and at the same operation have its end turned off square, or in a plane at right angles to the axis of the shaft, or in any other form that may be desirable. In order to accomplish this it is desirable that the drill for boring the end of the shaft be revolved at a much more rapid rate than is required for the cutters which turn off the end of the shaft; to attain these proper relative motions, and to bring up the cutters at the proper time, I have contrived the arrangement of machinery which I will now proceed to describe, in such a manner that others skilled in the art may understand and use my invention.

In the drawings A is the bed of the machine, from which rises at one end a post B, in the top of which is secured a hollow shaft $a$. Two screws $b$ one on each side, pass through the head of the post into the shaft $a$. A disk C (Fig. 3) having a hole through its center of a size to correspond with the interior of the hollow shaft $a$, is secured to the inner end of this shaft. Adjoining the disk C, and between it and the post B, is a hollow box or drum D (detached in Fig. 4) of the same diameter as the disk C; this drum is closed on the side next to the post B except a hole in the center, which fits over the hollow shaft $a$ on which it is free to revolve, motion being communicated to it by a screw thread $c$ on a shaft E having its bearings in two short standards $d$ which rise from the bed A. The screw $c$ engages with the notches $f$ formed on the periphery of the drum D for a portion of its circumference (as shown in Figs. 2 and 4). As the drum is only required to make a small portion of a revolution, these notches may be formed on its lower edge only.

The disk C (shown detached in Fig. 3) has attached to its face which is next to the drum D a ring $g$ which projects into the interior of the drum. Through this ring project the three pistons or bolts $h$, placed at equal distances around it; they also pass through holes in the hollow shaft $a$, and are so arranged as to lie parallel to the face of the disk C, and radial to the axis of the shaft $a$, while they slide back and forth in the ring $g$ and in the shaft $a$ toward and from the axis of the said shaft. The drum D has attached to its head and projecting inward, three eccentric cams $k$ against which the bolts $h$ bear (as in red Fig. 2). Thus as the drum is revolved as before explained in the direction of its arrow, the cams $k$ bear equally against each of the bolts $h$ and press them all toward the center, and cause them to bear equally on the three sides of the shaft or article $l$ to be centered, and bring its axis to coincide with that of the hollow shaft $a$; when the drum is turned back in the opposite direction and the bolts are relieved from the pressure of the cams, the two lower bolts drop out from the center by their own gravity, while the top one is retracted by a spring $i$ coiled around it, and the article $l$ after having been finished may be withdrawn.

The machinery by which the drill and cutters are operated will now be described. Two posts F rising from the bed A carry a hollow shaft G which has a slight play horizontally in its bearing in the tops of these posts. To the end of this shaft G next to the disk C is secured a cutter head H, which carries the two inclined cutters $n$ secured to it on opposite sides by screws $o$ passing through a clamp which binds the cutters to the cutter head, so that the cutters may be adjusted as required. Another shaft I revolves within the shaft G. It is somewhat longer than this shaft, and carries at the end which projects through the cutter head H, a drill $p$ for drilling the end of the article $l$ and also a tool $s$ for countersinking it; these tools are so attached to the end of the shaft that they may be readily removed to sharpen or temper them. To the other end of the shaft I where it projects beyond the end of the shaft G is secured a pinion wheel K which engages with a large gear wheel L on a shaft M lying parallel to the shaft G and a short distance to one side of it. This shaft M (shown in section Fig. 2) is supported on posts similar to the posts F and is revolved by the crank N or in any other suitable manner.

A pinion O on the shaft M engages with a gear wheel P secured on the hollow shaft G. By this arrangement of gearing it will be seen that while the shaft G and cutter head H are revolved at a moderate rate, the shaft I and drill $p$ will be carried at a greater speed. A set screw or follower $r$ passes through the head of a post Q rising from the rear end of the bed A, and bears against the end of the shaft I.

The operation of the machine is as follows: The article $l$, to be centered and turned off, is placed in the hollow shaft $a$, with its end projecting past the disk C, when the drum D is revolved a short distance in the direction of its arrow, by turning the screw shaft E; this confines the article in the center of the shaft $a$. (If the article is long its other end may be supported by a center as in an ordinary lathe.) The shaft M now being in motion, the screw $r$ is turned up. This moves the shaft I endwise (as shown in red Fig. 1) in the shaft G and causes the drill $p$ to penetrate the end of the article $l$ directly in its axis as the shaft I is revolved. When the shaft has been moved up far enough to make the drill penetrate the required depth, and the countersink to ream out the hole, the side of the pinion K is brought by the continued action of the screw $r$ against the end of the shaft G and this shaft is pushed up endwise in its bearings (as shown in red Fig. 1) carrying the cutters $n$ up to the end of the article $l$ which is turned off square and true by them, and the article is drilled, countersunk and finished at one operation.

The longitudinal movements allowed to the shafts I and G are not so great as to throw the pinions K and O out of gear with the wheels L and P.

What I claim as my invention and desire to secure by Letters Patent is—

The within described centering tool, consisting of the chuck C, D, constructed and operating as set forth; in combination with the shafts G and I arranged and operating as described.

DANIEL N. SMITH.

Witnesses:
   Thos. R. Roach,
   P. E. Teschemacher.